United States Patent
Bedell et al.

(10) Patent No.: US 7,617,201 B1
(45) Date of Patent: Nov. 10, 2009

(54) SYSTEM AND METHOD FOR ANALYZING STATISTICS IN A REPORTING SYSTEM

(75) Inventors: Jeffrey A. Bedell, Arlington, VA (US); Michael Codini, Herndon, VA (US); David Hutz, Herndon, VA (US); Douglas F. Meyer, Falls Church, VA (US); Luis V. Orozco, Vienna, VA (US); Ramkumar Ramachandran, Reston, VA (US); Steven S. Trundle, Falls Church, VA (US)

(73) Assignee: Microstrategy, Incorporated, McLean, VA (US)

( * ) Notice: Subject to any disclaimer, the term of this patent is extended or adjusted under 35 U.S.C. 154(b) by 1701 days.

(21) Appl. No.: 09/884,467

(22) Filed: Jun. 20, 2001

(51) Int. Cl.
 G06F 17/30 (2006.01)
 G06F 7/00 (2006.01)
(52) U.S. Cl. .................. 707/5; 702/179; 702/182
(58) Field of Classification Search ............... 707/102; 705/7

See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,406,477 A * | 4/1995 | Harhen | 703/6 |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,781,735 A | 7/1998 | Southard | |
| 5,864,856 A | 1/1999 | Young | |
| 5,914,878 A | 6/1999 | Yamamoto | |
| 5,935,218 A | 8/1999 | Beyda | |
| 6,012,066 A | 1/2000 | Discount | |
| 6,115,693 A * | 9/2000 | McDonough et al. | 705/10 |
| 6,138,121 A * | 10/2000 | Costa et al. | 707/100 |
| 6,138,155 A | 10/2000 | Davis | |
| 6,154,766 A * | 11/2000 | Yost et al. | 709/201 |
| 6,173,310 B1 * | 1/2001 | Yost et al. | 709/201 |
| 6,247,008 B1 | 6/2001 | Cambot | |
| 6,253,326 B1 * | 6/2001 | Lincke et al. | 726/12 |
| 6,260,050 B1 * | 7/2001 | Yost et al. | 715/501.1 |
| 6,279,033 B1 * | 8/2001 | Selvarajan et al. | 709/217 |

(Continued)

OTHER PUBLICATIONS

IBM "OS/390 Resource Measurement Facility Performance Management Guide", document SC28-1951-04, Sep. 2000.*

(Continued)

*Primary Examiner*—Luke S Wassum
(74) *Attorney, Agent, or Firm*—Hunton & Williams, LLP

(57) ABSTRACT

A system and method for monitoring and analyzing statistics regarding informational and transactional data is provided. Data distribution servers provide e-mail and other messages of topical interest to a subset of the subscribers. The content may be generated by an OLAP based channel database system, and the output may also be communicated to individuals via spreadsheet programs data, pager, telephone, mobile phone, fax, personal digital assistants, HTML e-mail and other formats, including a workbook file attachment. Statistics regarding the provided reports are generated and compiled. Analysis of the statistics may enable evaluations of system performance, application usage, and optimal configurations for the system.

28 Claims, 3 Drawing Sheets

U.S. PATENT DOCUMENTS

| | | | | |
|---|---|---|---|---|
| 6,282,267 | B1* | 8/2001 | Nolting | 379/32.03 |
| 6,298,123 | B1* | 10/2001 | Nolting et al. | 379/111 |
| 6,351,453 | B1* | 2/2002 | Nolting et al. | 370/234 |
| 6,363,488 | B1* | 3/2002 | Ginter et al. | 726/1 |
| 6,385,301 | B1* | 5/2002 | Nolting et al. | 379/32.01 |
| 6,393,406 | B1* | 5/2002 | Eder | 705/7 |
| 6,411,681 | B1* | 6/2002 | Nolting et al. | 379/1.01 |
| 6,453,269 | B1* | 9/2002 | Quernemoen | 702/186 |
| 6,567,796 | B1* | 5/2003 | Yost et al. | 707/2 |
| 6,581,069 | B1* | 6/2003 | Robinson et al. | 707/104.1 |
| 6,721,405 | B1* | 4/2004 | Nolting et al. | 379/133 |
| 6,744,866 | B1* | 6/2004 | Nolting et al. | 379/133 |
| 7,027,574 | B2* | 4/2006 | Nolting | 379/134 |
| 2001/0012345 | A1* | 8/2001 | Nolting et al. | 379/112.01 |
| 2001/0027388 | A1* | 10/2001 | Beverina et al. | 703/22 |
| 2001/0028706 | A1* | 10/2001 | Nolting | 379/134 |
| 2002/0046204 | A1* | 4/2002 | Hayes | 707/1 |
| 2002/0087286 | A1* | 7/2002 | Mitchell | 702/127 |
| 2002/0103660 | A1* | 8/2002 | Cramon et al. | 705/1 |
| 2002/0116247 | A1* | 8/2002 | Tucker et al. | 705/8 |
| 2002/0161778 | A1* | 10/2002 | Linstedt | 707/102 |
| 2002/0188452 | A1* | 12/2002 | Howes | 704/270 |
| 2003/0014326 | A1* | 1/2003 | Ben-Meir et al. | 705/26 |
| 2003/0065986 | A1* | 4/2003 | Fraenkel et al. | 714/47 |
| 2007/0203915 | A1* | 8/2007 | McCully | 707/10 |

OTHER PUBLICATIONS

Hahn, S. et al. "Capacity Planning for Business Intelligence Applications: Approaches and Methodologies", document SG24-5689-00, Nov. 2000.*

IBM "OS/390 Resource Measurement Facility User's Guide", document SC28-1949-06, Dec. 2000.*

IBM "OS/390 Resource Measurement Facility Report Analysis", document SC28-1950-05, 6$^{th}$ Edition, Sep. 2000, pp. 1-1 through 1-7, 2-240 through 2-262, and 5-1 through 5-52.*

Robert C. Stern, Bruce M. Anderson and Craig W. Thompson, A Menu-Based Natural Language Interface To A Large Database, Texas Instruments Incorporated, P. 0. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incotporated, Dallas, Texas, 21st Annual Meeting of the Association for Computational Linguistic, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. 0. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.

* cited by examiner

SYSTEM AND METHOD FOR ANALYZING STATISTICS IN A REPORTING SYSTEM

FIELD OF THE INVENTION

This invention relates to monitoring and analyzing statistics regarding informational and transactional content from a system, such as an reporting system, where the informational and transaction content may be provided to individuals through use of an output delivery system to email, web page, pager, mobile phone, fax, telephone, personal digital assistants and other terminal devices.

BACKGROUND OF THE INVENTION

Decision support systems have been developed to efficiently retrieve selected information from data warehouses. One type of decision support system is known as an on-line analytical processing system. In general, business intelligence, OLAP or reporting systems analyze data from various perspectives and support complex analyses against large input data sets.

Reports may be generated by obtaining information and providing the report to a user. A report may be provided in a client-server relationship, over a network access (e.g., posted on a web-site), or delivered directly to the subscriber. Current report systems, however, do not adequately track the statistics of the report or the informational and transactional content included therein.

These and other drawbacks exist.

SUMMARY OF THE INVENTION

The invention relates to a system and method for capturing and analyzing statistics or data related to operation of a report system. Informational and transactional content is provided to a subscriber (also referred to a user), such as via a web posting, e-mail, voice and other channels. Content may include informational, message or other forms of content, and may be in the form of a report. The captured statistics or data enables analysis of the report execution, as well as analysis of the report system itself.

According to an embodiment of the invention, content is aggregated from multiple data sources and services, such as databases, web pages, ERP Systems, XML based data sources and other sources. The aggregated content may be presented on a single page or report in an open source manner to a subscriber.

Statistics or data regarding the report, including the informational and transactional content included therein, and statistics or data regarding the report system itself may be captured and analyzed. Using analysis software or techniques, the statistics or data may be analyzed. Analysis may include determining system performance, application usage and optimal configurations for the system. Statistics or data may be obtained in real-time, thereby enabling an end user to view the report system in real-time.

As an example of the present system, a report may provide information about investments. Informational and transactional content related to the investments may be aggregated into a content report, such as stock prices, interest rates, and a portfolio value. The report system provides the content report to the subscriber, such as through use of an output delivery system to email, web page, pager, mobile phone, fax, telephone, personal digital assistants, WAP devices and other terminal devices. Also, a user may be able to access the report via a client-server or otherwise access the report from a reporting system, such as an OLAP system. Statistics or data about the report and the content included therein are captured and analyzed, enabling the profiling and understanding of current and historical system activity.

Other objects and advantages exist for the present invention.

DETAILED DESCRIPTION OF THE PRESENT INVENTION

The present invention provides for capturing statistics or data (hereinafter collectively referred to as statistics) to provide a view of server activity, such as, but not limited to, user sessions, reports, objects on reports, documents, and caches at different levels. Logged statistics may be analyzed, where one or more reports may be created based on the analysis. Reports based 20 on this data module may be provided to an end user for overall enterprise monitoring. Capturing relevant statistics from a reporting system may be used to profile and understand current system activity, as well as historical system activity. Relevant statistics and data may include, but are not limited to, overall system usage, individual user activity, usage data about reports, usage data about one or more objects used to operate and interact with the reporting system, database usage data (e.g., workload, response times, the number of connections to the database, etc.), and concurrency information (e.g., the number of concurrent users, the number of concurrent requests, the number of requests processed concurrently, the number of requests in the queue at any given time, etc.). Relevant statistics and data may also include server statistics (e.g., amount of memory, computer processing unit (CPU) and input/output resources utilized at a given point) and metadata usage (e.g., the number of requests for metadata, the types of requests for metadata, etc.). Other relevant statistics and data may also be used. For purposes of understanding the operation of the present invention, a description of a reporting system, such as an OLAP system, in which this invention may be utilized is provided below.

Figure 1:
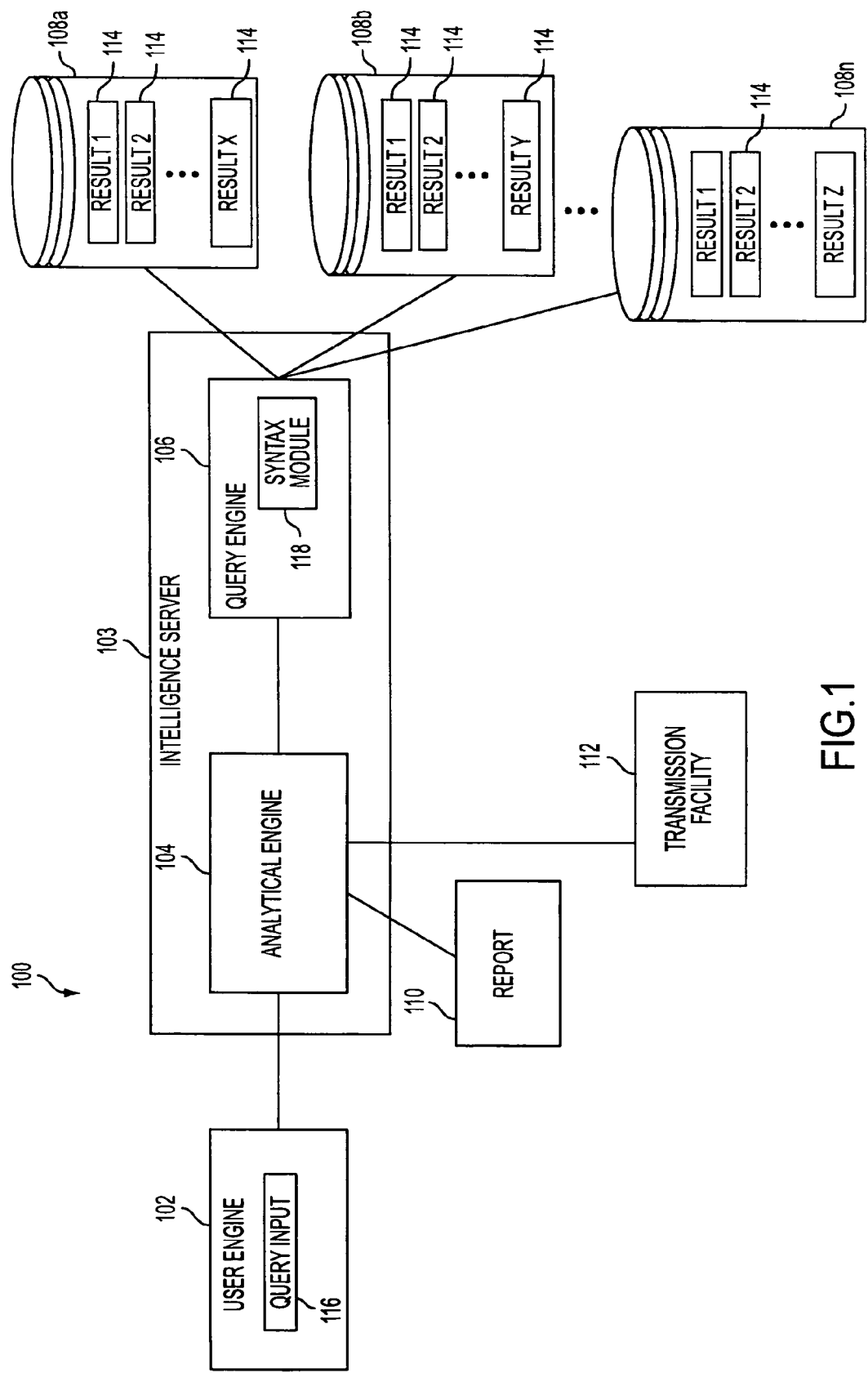
FIG. 1 is a block diagram illustrating an architecture for a reporting system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform, or future versions, which provides a preferred system in which the present invention may be implemented. Other platforms may also be used.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2™) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1 M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
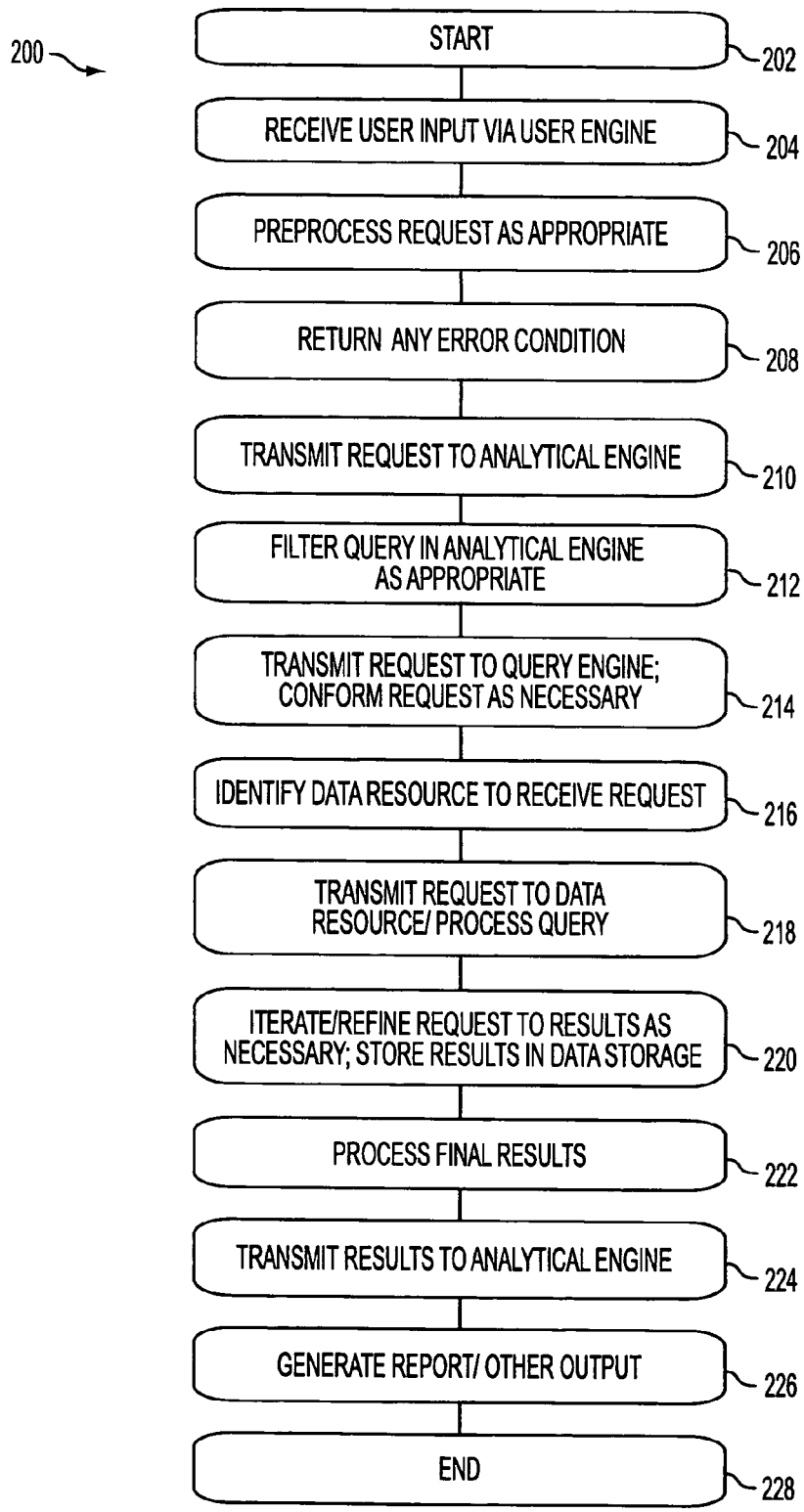
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

The present invention provides for capturing relevant statistics and data to enable profiling and/or understanding of current and historical activity of the reporting system. Statistics may be stored, where storage methods disk based, file system based, database based, object oriented database based (e.g., relational databases) or others, such as, but not limited to, NT Performance Monitor™ and NT Events Log™. Stored statistics may enable additional analysis of a reporting system activity, including identifying trends. Analyzing historical report system activity may include the ability to utilize decision support techniques and/or software to facilitate analysis.

Using and analyzing statistics from a report system may enable the report system to be optimized and tuned, such as various parts of the reporting system, including interfaces operating systems, databases, and informational sources. The present invention may enable identification of resource bottlenecks, spikes in user activities, cache hit ratios, the effectiveness of existing caches, recommendations for new caches and other changes to the reporting system. Statistics may also facilitate "charge-backs" and enable allocation of costs of the reporting system to various subscribers (within and outside of an organization) based on system usage.

According to an embodiment of the invention, a server used in connection with system 100 of FIG. 1 may record statistics, such as administrative statistics. Administrative statistics may be available for system administrators to analyze the operation of a server. Further, the server may provide for management of statistics, such as the ability to turn statistics logging on and off. According to an embodiment of the invention, one device for analyzing statistics is through a monitor which enables a user to view statistics gathered from the report system. A monitor may include one or more predetermined requests, where an end used may request particular statistics for evaluating the report system. Predetermined requests may include, but are not limited to, the top ten reports most provided to subscribers, web access trends, peak time periods, and job time-out reviews. In particular, a monitor such as MicroStrategy's Enterprise Manager™ may be used. To provide statistics monitoring, the present invention may provide a statistics module may collect data for a session module, a report module, a report detail module, a cache module and a document module. Data may be collected for other modules as well.

According to an embodiment of the invention, statistics may be gathered in real-time, thereby enabling an end user to analyze the reporting system in real-time or near real-time. Statistics reports may be generated in real-time or near real-time and then updated as new statistics are received, thereby providing a snapshot of the reporting system.

A system administrator may use statistics to monitor, configure, and tune a system. Statistics may enable analyses of system performance, indicate application usage and allow optimization of configurations within the system, as well as answer various questions regarding these topics. Statistics may be used for other analysis as well.

Analysis of system performance may include monitoring the status of the server. According to an embodiment of the invention, one or more transmission applications, such as a Narrowcaster® or Telecaster® applications by MicroStrategy, may be used in conjunction with a monitor so that a system administrator may be alerted when certain conditions occur. According to an embodiment of the invention, third party systems management software may be used in connection with the present invention, but is not limited to, Computer Associates Unicenter™, Microsoft's Manager Console™, NetIQ™, and Tivoli™. Analysis of system performance may also include linking with other performance metrics (e.g., via a performance monitor), understand caching effectiveness, understanding datamart effectiveness, understanding scheduling effectiveness, and tuning structural query language (SQL). According to an embodiment of the invention, statistics may enable an administrator to answer questions regarding system performance, including identifying system bottlenecks, whether an additional server should be added, whether server functions may be spread over multiple machines, how a metadata database server is impacting the system, and whether the metadata database should be moved to a separate machine. According to an embodiment of the invention, automated tuning of the report system may occur based on statistics and statistics reports. Automated tuning may include, but is not limited to, adding or removing resources from an analytical engine or a query engine. Other analysis and questions may also be performed and determined.

Indicating application usage may include indicating report and/or document usage, user activity, such as drill-downs and prompts, user access patterns (e.g., time of day, day of month, etc.), billing functions, such as system resources used by a user and other usage. According to an embodiment of the invention, statistics may enable an administrator to answer questions regarding application usage, including what tables a query is hitting, what additional aggregate tables are needed, whether a larger percentage of reports should be cached, what reports/objects are being used, what does the query access pattern look like, where does the database need tuning, and how could reports be designed more efficiently. Statistics may also include information on actions taken by a subscriber upon receiving a report from the reporting system. Actions may include, but are not limited to, deleting a report, accessing the report, forwarding the report and instructing a transaction based on the report. Other analysis and questions may also be performed and determined.

Optimization of a system's configuration may include determining optimal processing units structure, thread allocation structure, priority servicing scheme, prioritization functions, and governing parameters. According to an embodiment of the invention, statistics may enable an administrator to answer questions regarding optimal system configuration, including whether governing parameters should be changed, and whether the DSS Server should be tuned to run faster. Other analysis and questions may also be performed and determined.

According to an embodiment of the invention, an administrator may have a consistent view of all server-related statistics, regardless of the interface used to view them. That is, information stored in the statistics database may be consistent with similar measurements provided through the other sources of information. such as an NT Performance counter. By way of example, if a report regarding an engine mode in a reporting system client-server arrangement, indicates that it took 3 seconds to generate a SQL, then the same figure should be recorded in the statistics database. Other sources of information may include a server statistics database, including derived projects including, but not limited to a monitor, NT Performance Monitor, monitoring interfaces in the Server Administrator API, monitoring functionality in the Server Administrator GUI, and information presented in "Engine Mode" of the reporting system client-server system. Other sources of information may also be available.

According to an embodiment of the invention, statistics collection may be supported on any platforms, such as platforms which support a metadata repository (e.g., MicroStrategy's Narrowcaster® platform). Platforms may include MS SQL Server 7.0, Oracle 7.3, Oracle 8.0, Oracle 8I, and DB2 UDB 5.2. Statistics may be also supported for other platforms.

A server configuration application may create statistics tables. According to an embodiment of the invention, statistics tables may be created in a similar manner to the way repository tables are created. Separate DDL scripts may be available for each platform. Statistics may be configured at a server-project level.

According to an embodiment of the invention, an administrator may prefer certain requirements. By way of example, different database servers may be used for the statistics database and the metadata repository. The database server may not necessarily be the same for both. By way of another example, an administrator may determine what database connections are being used for purposes of logging statistics. By way of another example, some customers may use a warehouse database server to host the statistics database. Other requirements may also be used.

The amount of statistics logging may be configurable. Statistics can be categorized into groups to enable configuration. Categorizing statistics may limit any performance impact of gathering statistics as well as the storage requirements. The categories used may depend on the design by an administrator, but may include user sessions, metadata object requests, element browse requests, report requests, and document requests. Other categories may also be used.

Administrators may selectively purge statistics (i.e., delete records) from a statistics database. The functions supported for purging statistics may include purging by date, purging by server and date, and purging by project and date. Purging by date may enable deletion of all statistics generated prior to a specific date or all statistics generated between two dates. Purge by server and date may enable deletion of statistics generated by a specific server. Purge by project and date may enable deletion of statistics generated for a specific project. Other functions for purging statistics may also be used.

According to an embodiment of the invention, in order to provide the real-time alert reporting to an administrator, statistics may be logged within a specified time period (e.g., 5 minutes) of collection time. Other time periods may also be used. A user may view statistics in real-time, where the statistics are generated and updated in real-time, as reports and contents are provided through the system being monitored. Statistics reports may be continuously written in real-time as statistics are gathered. This may enable statistics to be tracked as the content is provided (e.g., as content streams from the server) without having to store statistics. According to another embodiment of the invention, statistics may be built up (e.g., stored for some predetermined time) before being written to a statistics report.

Multiple servers may all use a single set of statistics tables, such as for the case of clustered configurations. Statistics tables may support analysis of all requests going through the cluster as a whole and analysis of requests going through a single node in the cluster. Other configurations of statistics tables may also be used.

According to an embodiment of the invention, for the statistics to be meaningful, the processing that a server performs may be defined for an end user of the statistics. For purposes of collecting statistics, various categories of information may be tracked, including user sessions, metadata object requests, element browse requests, report execution requests, and document execution requests. Other categories may also be used.

A user may interact with a server in the context of a user session. Within a user session, the user may submit categories of requests to the server. For each type of request, the server may perform a sequence of tasks, which may be referred to as the executive flow. For some tasks, the server may queue the requests, e.g., there may be queue time associated with some tasks. In a request for metadata object(s), a client may submit the request to a server. The server receives the request, creates a job (e.g., the request for metadata objects) and starts it. The server processes the object request. Processing the object request may have a queue time associated with it. The server passes the result back to client, where the client receives the result.

According to an embodiment of the invention, results may be in the form of one or more statistics reports. Statistics reports may include, but are not limited to, activity by user, average execution time vs. number of jobs per user, average execution time vs. number of sessions, cache analysis, database result rows by user, database result rows by report, execution cycle breakdown, job cancelled review, job interruption trend, job performance trend, peak time periods, scheduled report load, server activity analysis, top ten longest executing reports, top ten reports, web access trends, web and non-web usage, and web usage statistics. By way of example, if cache analysis report is requested, column metrics for the report may include, but are not limited to, the number of jobs with cache creation, the number of jobs with a cache hit and the number of jobs without a cache hit, while row metrics may include, but are not limited to, all open issues by severity and by issue type overall and by team, all open issues by severity, and all open issues by issue type, severity and event, overall, by team and by page. By way of another example, if a database results rows by report is requested, column metrics may include, but are not limited to, the number of jobs, the number of database result rows and the average elapsed duration per job, while row metrics may include, but are not limited to, issue list, issue count, all-technology issue count, issue count over time, count assigned or unfixed, general count, count RTT, count TBC, issue count by report, daily open issue counts, components, enterprise monitor issue counts, web report creation, enterprise monitor issues, and team counts. In an execution cycle breakdown request, column metrics may include, but are not limited to, average queue duration per job, average analytical engine duration, average SQL execution duration, and average SQL generation duration, while row metrics may comprise dates or other indications. If an average execution time vs. the number of jobs per user is requested, the column metric may include, but is not limited to, average number of jobs per user and average elapsed duration per job, while the row metric may comprise dates or other indications.

A cache request may be used to analyze statistics related to caching within the reporting system. Caching may occur within various components of the reporting system, such as, but not limited to, a web server, an application server, and a database server. By looking at the caches, such as by viewing the top ten cache hits, a report system may be more thoroughly analyzed. Analysis may include, but is not limited to, determining if caching is efficiently used within the report system.

Figure 3:
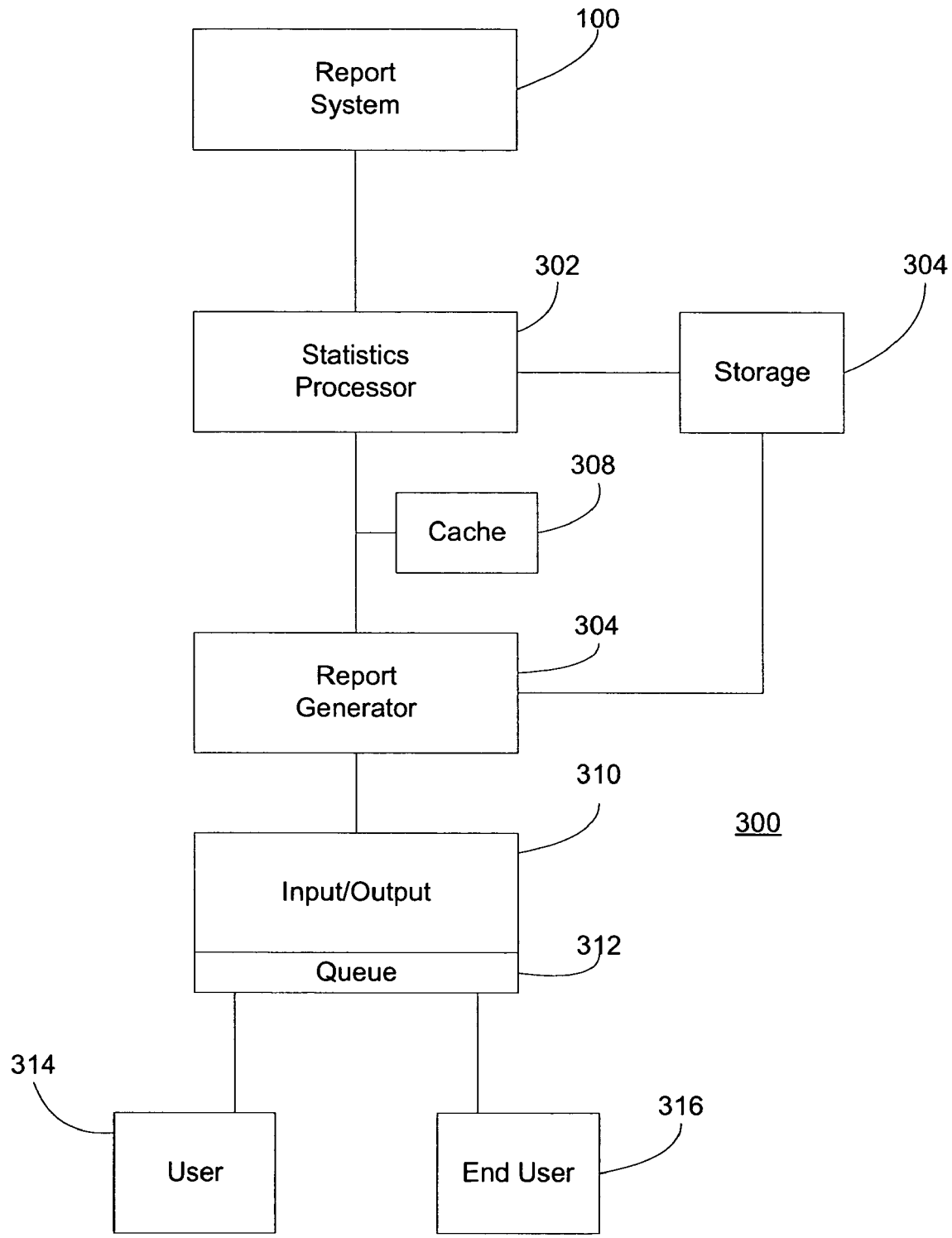
FIG. 3 is a block diagram illustrating an architecture for a statistics analysis system according to an embodiment of the invention.

FIG. 3 illustrates a system 300 for capturing statistics and data from a reporting system for analyzing and understanding current and historical reporting system activity. Statistics processor module 302 interacts with report system 100 from FIG. 1 to gather statistics. Statistic report generator module 304 generates statistics reports. User module 314 of system 300 may provide a request for one or more statistics through input/output module 310. User module 314 may be a computer processor, PDA, or any other device which enables a person to interact with system 300. A request may be stored in queue 312 in input/output module 310. Queue 312 may also be located in other modules within system 300.

Based on a request received at input/output module 310, statistics report generator module 304 may generate a statistics report using gathered statistics. According to an embodiment of the invention, statistics may accumulate in cache module 308 before a statistics report is generated by statistics report generating module 304. Statistics gathered by statistics processor module 302 and statistics reports generated by statistics report generating module 304 may be stored in storage module 306. Multiple storage modules 306 may be used to store statistics and statistics reports. Statistics reports may be transmitted by input/output module 310 to an end user module 316. End user module 316 may be a computer processor, PDA, or any other device which enables a person to interact with system 300 to view a statistics report. Other configurations for system 300 may also be used, as well as other system for capturing and analyzing statistics.

An element browse request may enable an end user to various elements provided by the system. By way of example, a client submits the request, which is received by the server. The server creates a job and starts it. Information for the job is resolved, the server generates a SQL and executes the job (which may include SQL execution and analytical processing). The element results are prepared by the server. The server passes the result back to client, which receives the results. One or more steps with this process may have a queue time associated with it. According to an embodiment of the invention, if an element browse request uses the cache, the request may go through a slightly different execution flow. A client submits a request to a server. The server creates a job and starts it. The server prepares the element results, and passes the result back to client. One or more of these steps may have a queue time associated with it.

A report execution request may reflect an end user's view of the execution flow for the executing of one or more report(s). A client submits a request to a server. The server creates a job, starts it and resolves information for the job. The server generates a SQL, and executes the job (which may include SQL execution and analytical processing). The server crosstabs or reformats the results, and passes result back to client. If a cached report is executed, the client may submit a request to a server. The server passes results back to the client. One or more of these steps may have a queue time associated with it.

If a report request contains prompts, the request may be submitted to the server by the client. The server creates a job, starts it, and resolves information for the prompt. The server then passes the prompt back to client, where the client receives a prompt question. The client then submits a second request, which then follows the execution flow of a "normal case," described above. Thus, a request for a report with prompts may result in two statistics records: one for the resolving the prompt and one for executing the report once the answers are given. One or more of these steps may have a queue time associated with it.

A scheduled report may proceed through the same execution flow as a report request submitted by a remote client. For example, such an execution flow may include a scheduler submitting a request to a server. The server creates a job, starts it and resolves information for the job. The server generates a SQL and executes the job (which may include SQL execution and analytical processing). The server may cross-tab the results and pass the results back to the client or scheduler, who receives result. One or more of these steps may have a queue time associated with it.

According to an embodiment of the invention, the execution flow for a document execution request may include a client submitting a request to the server. The server may create a job, start it, and resolve report information for the job. The server executes the document (which may include multiple report executions) and pass the results back to the client. The server may spawn additional jobs/requests for a document's constituent reports. Each of these additional jobs/requests may follow the execution flow described above for report requests. Therefore, a single document request may result in N+1 records in the statistics database, where one record is for the document request itself and N is for the constituent reports, where N is the number of reports. One or more of these steps may have a queue time associated with it. Other execution flows for other requests may be used.

The specifications for statistics database tables may be maintained in a separate document. According to an embodiment of the invention, this document may specify the exact information required for each type of request described above. In addition, the document may define all fields in all tables, their meanings, and the corresponding DDL for all supported platforms. Other specifications may also used.

Other embodiments and uses of the invention will be apparent to those skilled in the art from consideration of the specification and practice of the invention disclosed herein. The specification and examples should be considered exemplary only.

What is claimed is:

1. A computer-implemented method for capturing at least one statistic or data regarding performance operation of a business intelligence reporting system that generates business intelligence reports based on requests submitted to perform analysis of data contained in a database, the method comprising the steps of:
    gathering at least one statistic or data related to the performance operation of the reporting system while the reporting system is operating;
    analyzing the at least one statistic or data;
    generating at least one output based on the gathered at least one statistic or data, wherein the at least one output includes an alert if the analysis of the at least one statistic or data indicates that a condition has occurred, and wherein executing the requests results in two statistics records for the requests containing prompts; and
    categorizing the at least one statistic or data into one of a plurality of groups to configure a frequency of gathering the at least one statistic or data.

2. The computer-implemented method according to claim 1, further comprising the step of providing the output to an end user.

3. The computer-implemented method according to claim 1, further comprising the step of storing the at least one gathered statistic or data in a database accessible by the reporting system for generating reports utilizing the gathered statistic or data.

4. The computer-implemented method according to claim 1 further comprising the step of providing the output to an end user in real-time, enabling the end user to analyze the reporting system in real-time.

5. The computer-implemented method according to claim 1, further comprising the step of analyzing the output, where analyzing the output comprises using at least one of:
    a) a decision support technique; and
    b) a decision support software.

6. The computer-implemented method according to claim 1, where the at least one statistic or data is related to at least one of:
    a) metadata usage;
    b) server data;
    c) concurrency data;
    d) overall system usage;
    e) individual user activity;
    f) report usage data;
    g) report definition data;
    h) standard query language data;
    i) object usage data; and
    j) database usage data.

7. The computer-implemented method according to claim 1, further comprising the step of allocating costs of reporting system usage to a user of the reporting system based on the at least one output.

8. The computer implemented method according to claim 1, wherein the reporting system is an OLAP system.

9. The computer-implemented method according to claim 1, further comprising the step of performing automated tuning of the reporting system based on the at least one output.

10. A medium storing code for causing a processor to capture at least one statistic or data regarding performance operation of a business intelligence reporting system that generates business intelligence reports based on requests submitted to perform analysis of data contained in a database, the medium comprising:
    code for causing a processor to gather at least one statistic or data related to the operation of the reporting system while the reporting system is operating;
    code for causing a processor to analyze the at least one statistic or data;
    code for causing a processor to generate at least one output based on the gathered at least one statistic or data, wherein the at least one output includes an alert if the code for causing a processor to analyze the at least one statistic or data indicates that a condition has occurred, and wherein executing the requests results in two statistics records for the requests containing prompts; and
    code for causing a processor to categorize the at least one statistic or data into one of a plurality of groups to configure a frequency of gathering the at least one statistic or data.

11. The medium according to claim 10, further comprising code for causing a processor to provide the output to an end user.

12. The medium according to claim 10, further comprising code for causing the processor to store the at least one gathered statistic or data in a database accessible by the reporting system for generating reports utilizing the gathered statistic or data.

13. The medium according to claim 10, further comprising code for causing the processor to provide the output to an end user in real-time, enabling the end user to analyze the reporting system in real-time.

14. The medium according to claim 10, further comprising code for causing the processor to analyze the output, where analyzing the output comprises using at least one of:
   a) a decision support technique; and
   b) a decision support software.

15. The medium according to claim 10, where the at least one statistic or data is related to at least one of:
   a) metadata usage;
   b) server data;
   c) concurrency data;
   d) overall system usage;
   e) individual user activity;
   f) report usage data;
   g) report definition data;
   h) standard query language data;
   i) object usage data; and
   j) database usage data.

16. The medium according to claim 10, further comprising code for causing the processor to allocate costs of reporting system usage to a user of the reporting system based on the at least one output.

17. The medium according to claim 10, wherein the reporting system is an OLAP system.

18. The medium according to claim 10, further comprising code for causing the processor to automatically tune the reporting system based on the at least one output.

19. The computer-implemented method according to claim 1, wherein the at least one statistic or data is gathered to monitor processing of a cache request.

20. A system for capturing at least one statistic or data regarding performance operation of a business intelligence reporting system that generates business intelligence reports based on requests submitted to perform analysis of data contained in a database, the system comprising:
   a statistics processor module for gathering at least one statistic or data related to the operation of the reporting system while the reporting system is operating;
   an analytical engine for analyzing the at least one statistic or data;
   a statistics report generator module for generating at least one output based on the gathered at least one statistic or data, wherein the at least one output includes an alert if the analytical engine indicates that a condition has occurred based on the analysis of the at least one statistic or data, and wherein executing the requests results in two statistics records for the requests containing prompts; and
   a storage module for categorizing the at least one statistic or data into one of a plurality of groups to configure a frequency of gathering the at least one statistic or data.

21. The system according to claim 20, further comprising an output module for providing the output to an end user.

22. The system according to claim 20, wherein the storage module stores the at least one gathered statistic or data in a database accessible by the reporting system for generating reports utilizing the gathered statistic or data.

23. The system according to claim 20, further comprising an output module for providing the output to an end user in real-time, enabling the end user to analyze the reporting system in real-time.

24. The system according to claim 20, wherein the analytical engine analyzes the output, where analyzing the output comprises using at least one of:
   a) a decision support technique; and
   b) a decision support software.

25. The system according to claim 20, where the at least one statistic or data is related to at least one of:
   a) metadata usage;
   b) server data;
   c) concurrency data;
   d) overall system usage;
   e) individual user activity;
   f) report usage data;
   g) report definition data;
   h) standard query language data;
   i) object usage data; and
   j) database usage data.

26. The system according to claim 20, wherein the statistics report generation module allows allocation of costs of reporting system usage to a user of the reporting system based on the at least one output.

27. The system according to claim 20, wherein the reporting system is an OLAP system.

28. The system according to claim 20, further comprising an intelligence server capable of performing automated tuning of the reporting system based on the at least one output.

* * * * *

UNITED STATES PATENT AND TRADEMARK OFFICE
CERTIFICATE OF CORRECTION

PATENT NO. : 7,617,201 B1
APPLICATION NO. : 09/884467
DATED : November 10, 2009
INVENTOR(S) : Bedell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this

Nineteenth Day of October, 2010

David J. Kappos
*Director of the United States Patent and Trademark Office*